United States Patent
Gandhi et al.

(10) Patent No.: US 11,285,844 B2
(45) Date of Patent: Mar. 29, 2022

(54) VEHICLE SEAT WITH MORPHING PORTIONS

(71) Applicants: Toyota Motor Engineering & Manufacturing North America, Inc., Plano, TX (US); Miga Technologies, LLC, Silverton, OR (US)

(72) Inventors: Umesh N. Gandhi, Farmington Hills, MI (US); Brian J. Pinkelman, Ann Arbor, MI (US); Ryohei Tsuruta, Ann Arbor, MI (US); Mark A. Gummin, Silverton, OR (US)

(73) Assignees: Toyota Motor Engineering & Manufacturing North America, Inc., Plano, TX (US); Miga Technologies, LLC, Silverton, OR (US)

( * ) Notice: Subject to any disclaimer, the term of this patent is extended or adjusted under 35 U.S.C. 154(b) by 336 days.

(21) Appl. No.: 16/263,879

(22) Filed: Jan. 31, 2019

(65) Prior Publication Data

US 2020/0247274 A1     Aug. 6, 2020

(51) Int. Cl.
*B60N 2/00*     (2006.01)
*B60N 2/02*     (2006.01)
*B60N 2/66*     (2006.01)

(52) U.S. Cl.
CPC ......... *B60N 2/0244* (2013.01); *B60N 2/0296* (2013.01); *B60N 2/6671* (2015.04); *B60N 2002/026* (2013.01); *B60N 2002/0268* (2013.01)

(58) Field of Classification Search
CPC ................ B60N 2002/026; B60N 2002/0268
(Continued)

(56) References Cited

U.S. PATENT DOCUMENTS 5,583,844 A     12/1996 Wolf et al.
6,155,716 A     12/2000 Okamura et al.
(Continued)

FOREIGN PATENT DOCUMENTS

CN     101417152 A     4/2009
CN     102333504 A     1/2012
(Continued)

OTHER PUBLICATIONS

"Guhmann, Andreas, Pneumatically adjustable side edges for vehicle seats (English), Google Patents" (Year: 2010).*
U.S. Appl. No. 16/367,457, filed Mar. 28, 2019.

*Primary Examiner* — Thomas E Worden
*Assistant Examiner* — Tiffany P Ohman
(74) *Attorney, Agent, or Firm* — Christopher G. Darrow; Darrow Mustafa PC

(57) ABSTRACT

A vehicle seat can be configured to selectively provide support to a vehicle occupant in conditions when lateral acceleration is experienced. An actuator can be located within the vehicle seat. When activated, the actuator cause a portion of the seat to morph into an activated configuration. The actuator can be activated based on vehicle speed, steering angle, and/or lateral acceleration. The actuator can include a main body member, a first end member pivotably connected to a first end region of the main body member, and a second end member pivotably connected to a second end region of the main body member. The actuator can include shape memory material connecting members. The actuator can be configured such that, in response to an activation input, the shape memory material connecting members contract, causing the first and second end members pivot, which causes the actuator to morph into an activated configuration.

20 Claims, 7 Drawing Sheets

(58) Field of Classification Search
USPC .......................................................... 701/49
See application file for complete search history.

(56) References Cited

U.S. PATENT DOCUMENTS

| | | | |
|---|---|---|---|
| 6,481,799 B1 | 11/2002 | Whalen | |
| 6,912,748 B2 | 7/2005 | VanSickle | |
| 6,998,546 B1 | 2/2006 | Schmidt et al. | |
| 7,125,077 B2 | 10/2006 | Frank | |
| 7,237,847 B2 | 7/2007 | Hancock et al. | |
| 7,484,735 B2 | 2/2009 | Verbrugge et al. | |
| 7,892,630 B1 | 2/2011 | McKnight et al. | |
| 7,901,524 B1 | 3/2011 | McKnight et al. | |
| 7,905,538 B2 | 3/2011 | Ukpai et al. | |
| 7,909,403 B2 | 3/2011 | Lawall et al. | |
| 8,126,615 B2 | 2/2012 | McMillen et al. | |
| 8,240,677 B2 | 8/2012 | Browne et al. | |
| 8,313,108 B2 | 11/2012 | Ac et al. | |
| 8,366,057 B2 | 2/2013 | Vos et al. | |
| 8,702,120 B2 | 4/2014 | Kalisz et al. | |
| 9,428,088 B1 | 8/2016 | Rajasingham | |
| 9,457,813 B2 | 10/2016 | Hoerwick et al. | |
| 9,495,875 B2 | 11/2016 | Dowdall et al. | |
| 9,696,175 B2 | 7/2017 | Hansen et al. | |
| 9,784,590 B2 | 10/2017 | Englehardt et al. | |
| 9,827,888 B2 | 11/2017 | Patrick et al. | |
| 10,007,263 B1 | 6/2018 | Fields et al. | |
| 10,532,672 B1 | 1/2020 | Pinkelman et al. | |
| 2003/0182041 A1 | 9/2003 | Watson | |
| 2004/0261411 A1 | 12/2004 | MacGregor | |
| 2005/0082897 A1 | 4/2005 | Ropp et al. | |
| 2005/0198904 A1 | 9/2005 | Browne et al. | |
| 2005/0206096 A1 | 9/2005 | Browne et al. | |
| 2005/0211198 A1 | 9/2005 | Froeschle et al. | |
| 2006/0038745 A1 | 2/2006 | Naksen et al. | |
| 2006/0223637 A1 | 10/2006 | Rosenberg | |
| 2007/0046074 A1 | 3/2007 | Satta et al. | |
| 2007/0246285 A1 | 10/2007 | Browne et al. | |
| 2007/0246898 A1 | 10/2007 | Keefe et al. | |
| 2009/0218858 A1 | 9/2009 | Lawall et al. | |
| 2009/0224584 A1 | 9/2009 | Lawall et al. | |
| 2009/0224587 A1 | 9/2009 | Lawall et al. | |
| 2009/0242285 A1 | 10/2009 | Whetstone, Jr. | |
| 2010/0282902 A1 | 11/2010 | Rajasingham | |
| 2011/0038727 A1 | 2/2011 | Vos et al. | |
| 2012/0232783 A1 | 9/2012 | Calkins et al. | |
| 2012/0319445 A1 | 12/2012 | Zolno et al. | |
| 2014/0333088 A1 | 11/2014 | Lang et al. | |
| 2015/0016968 A1 | 1/2015 | Grabowska et al. | |
| 2015/0197173 A1 | 7/2015 | Hulway | |
| 2015/0202993 A1 | 7/2015 | Mankame et al. | |
| 2016/0004298 A1 | 1/2016 | Mazed et al. | |
| 2016/0084665 A1 | 3/2016 | Englehardt et al. | |
| 2017/0116792 A1 | 4/2017 | Jelinek et al. | |
| 2017/0148102 A1 | 5/2017 | Franke et al. | |
| 2017/0166222 A1 | 6/2017 | James | |
| 2017/0252260 A1 | 9/2017 | Gummin et al. | |
| 2018/0012433 A1 | 1/2018 | Ricci | |
| 2018/0036198 A1 | 2/2018 | Mergl et al. | |
| 2018/0130347 A1 | 5/2018 | Ricci et al. | |
| 2018/0141562 A1 | 5/2018 | Singhal | |
| 2018/0251234 A1 | 9/2018 | Wang | |
| 2018/0264975 A1 | 9/2018 | Bonk et al. | |
| 2018/0345841 A1 | 12/2018 | Prokhorov et al. | |
| 2019/0023161 A1 | 1/2019 | Sullivan et al. | |
| 2019/0042857 A1 | 2/2019 | Endo et al. | |
| 2019/0059608 A1 | 2/2019 | Yan et al. | |
| 2020/0223325 A1 | 7/2020 | Pinkelman et al. | |
| 2020/0238854 A1 | 7/2020 | Gandhi et al. | |
| 2020/0282878 A1 | 9/2020 | Gandhi et al. | |
| 2020/0298732 A1 | 9/2020 | Gandhi et al. | |

FOREIGN PATENT DOCUMENTS

| | | | |
|---|---|---|---|
| CN | 103038094 A | 4/2013 | |
| CN | 105517664 A | 4/2016 | |
| CN | 107111473 A | 8/2017 | |
| DE | 102010021902 A1 | 12/2011 | |
| EP | 1904337 B1 | 12/2006 | |
| EP | 1904337 B1 * | 10/2010 | ............... A47C 4/54 |
| EP | 2723069 A1 | 4/2014 | |
| JP | 2017175155 A | 9/2017 | |
| KR | 20050056526 A | 6/2005 | |
| KR | 101395364 B1 | 5/2014 | |
| WO | 2009079668 A2 | 6/2009 | |
| WO | 2011017071 A2 | 2/2011 | |
| WO | 2014145018 A2 | 9/2014 | |
| WO | 2014172320 A1 | 10/2014 | |
| WO | 2016130719 A2 | 8/2016 | |
| WO | 2017077541 A1 | 5/2017 | |

* cited by examiner

VEHICLE SEAT WITH MORPHING PORTIONS

FIELD

The subject matter herein relates in general to vehicles and, more particularly, to vehicle seats.

BACKGROUND

While a vehicle is in use, there are various forces that act upon the vehicle and its occupants. For instance, when the vehicle turns right or left, particularly at relatively high speeds, lateral acceleration may make a vehicle occupant feel like he or she is being pushed sideways in the opposite direction of the turn. A deep seat and stiff bolster and seat cushion can help reduce these effects.

SUMMARY

In one respect, the subject matter described herein is directed to an actuator. The actuator can include a main body member. The main body member can have a first end region and a second end region. The actuator can include a first end member pivotably connected to the first end region of the main body member. The actuator can include a first shape memory material connecting member that connects the first end member to the main body member. The actuator can further includes a second end member. The second end member can be pivotably connected to the second end region of the main body member. The actuator can also include a second shape memory material connecting member that connects the second end member to the main body member. The actuator can have a first dimension and a second dimension. The first dimension can be substantially perpendicular to the second dimension. The first dimension can be in a direction that extends through the first end member and the second end member. The actuator can be configured such that, when an activation input is provided to the first and second shape memory material connecting members, the first and second shape memory material connecting members contract. As a result, the first and second end members pivot, which, in turn, causes the actuator to morph into an activated configuration in which the second dimension increases.

In one respect, the subject matter described herein is directed to a vehicle seat system. The system can include a vehicle seat. The system can include one or more actuators located within the vehicle seat. The one or more actuators can be operatively positioned such that, when activated, the one or more actuators cause a portion of the seat to morph into an activated configuration. The actuator(s) can include a main body member. The main body member can have a first end region and a second end region. The actuator(s) can include a first end member pivotably connected to the first end region of the main body member. The actuator(s) can include a first shape memory material connecting member that connects the first end member to the main body member. The actuator(s) can further includes a second end member. The second end member can be pivotably connected to the second end region of the main body member. The actuator(s) can also include a second shape memory material connecting member that connects the second end member to the main body member. The actuator(s) can have a first dimension and a second dimension. The first dimension can be substantially perpendicular to the second dimension. The first dimension can be in a direction that extends through the first end member and the second end member. The actuator(s) can be configured such that, when an activation input is provided to the first and second shape memory material connecting members, the first and second shape memory material connecting members contract. As a result, the first and second end members pivot, which, in turn, causes the actuator(s) to morph into an activated configuration in which the second dimension increases.

In another respect, the subject matter described herein is directed to a method of morphing a portion of a vehicle seat. One or more actuators can be located within the vehicle seat. The one or more actuators can be operatively positioned such that, when activated, the one or more actuators cause a portion of the seat to morph into an activated configuration. The actuator(s) can include a main body member. The main body member can have a first end region and a second end region. The actuator(s) can include a first end member pivotably connected to the first end region of the main body member. The actuator(s) can include a first shape memory material connecting member that connects the first end member to the main body member. The actuator(s) can further includes a second end member. The second end member can be pivotably connected to the second end region of the main body member. The actuator(s) can also include a second shape memory material connecting member that connects the second end member to the main body member. The actuator(s) can have a first dimension and a second dimension. The first dimension can be substantially perpendicular to the second dimension. The first dimension can be in a direction that extends through the first end member and the second end member. The actuator(s) can be configured such that, when an activation input is provided to the first and second shape memory material connecting members, the first and second shape memory material connecting members contract. As a result, the first and second end members pivot, which, in turn, causes the actuator(s) to morph into an activated configuration in which the second dimension increases.

DETAILED DESCRIPTION

Figure 1:
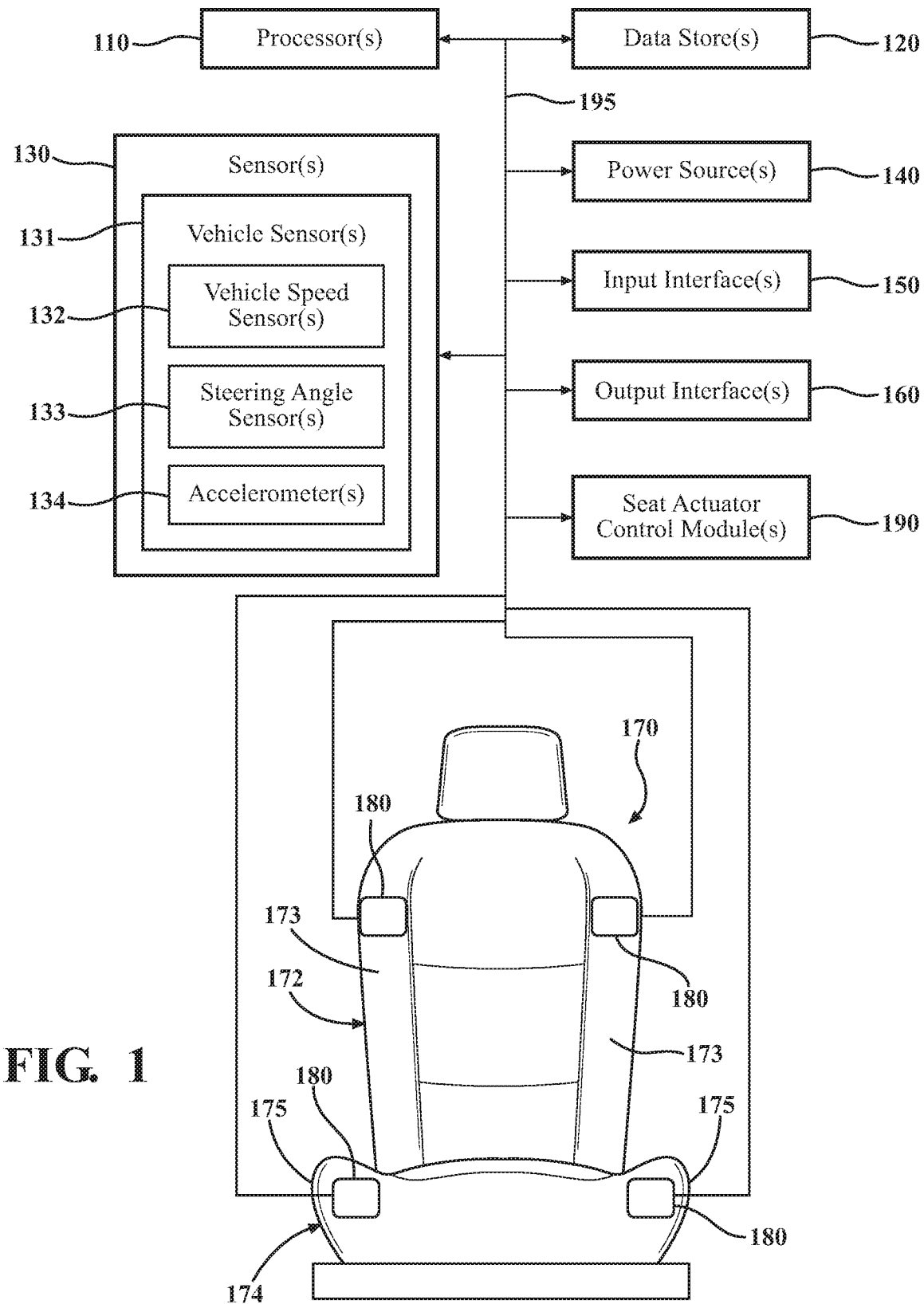
FIG. 1 is an example of a vehicle.

While deep seats and stiff bolsters and seat cushions can help reduce the effects of lateral acceleration, such features may add to discomfort of a passenger during normal driving conditions in which larger lateral acceleration forces are not experienced by vehicle occupants. Accordingly, arrangements described here are directed to vehicle seats configured to selectively provide lateral support to a vehicle occupant in conditions when higher lateral acceleration is experienced. To that end, one or more seat actuators located within the vehicle seat. The one or more actuators can be operatively positioned such that, when activated, the one or more actuators cause a portion of the seat to morph into an activated configuration.

The one or more actuators can be any suitable type of actuator. For instance, the one or more actuators can include a main body member with a first end member and a second end member. The first and second end members can be pivotably connected on opposite end regions of the main body member. The actuator can include shape memory material connecting members, which can be, for example, shape memory alloy. The actuator can be configured such that, in response to an activation input (e.g., heat), the shape memory material connecting members contract, causing the first and second end members pivot, which causes the actuator to morph into an activated configuration.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, a portion of a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle may be a watercraft, an aircraft or any other form of motorized transport.

The vehicle 100 can have an autonomous operational mode and/or a semi-autonomous operational mode. For instance, the vehicle 100 can have an autonomous operational mode in which one or more computing systems are used to navigate and/or maneuver the vehicle along a travel route with no input or supervision required from a human driver. The vehicle 100 can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. The vehicle 100 can have a manual operational mode in which all of or a majority of the navigation and/or maneuvering of the vehicle is performed by a human driver. In one or more arrangements, the vehicle 100 can be a conventional vehicle that is configured to operate in only a manual mode.

The vehicle 100 can include various elements. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements may be shown as being located on or within the vehicle 100 in FIG. 1, it will be understood that one or more of these elements can be located external to the vehicle 100. Thus, such elements are not located on, within, or otherwise carried by the vehicle 100. Further, the elements shown may be physically separated by large distances. Indeed, one or more of the elements can be located remote from the vehicle 100.

The vehicle 100 can include one or more processors 110, one or more data stores 120, one or more sensors 130, one or more power sources 140, one or more input interfaces 150, one or more output interfaces 160, one or more seats 170, one or more seat actuators 180, and one or more seat actuator control modules 190. Each of these elements will be described in turn below.

As noted above, the vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, one or more processors 110 can be a main processor(s) of the vehicle 100. For instance, one or more processors 110 can be electronic control unit(s) (ECU).

The vehicle 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

The vehicle 100 can include one or more sensors 130. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the vehicle 100 includes a plurality of sensors 130, the sensors can work independently from each other. Alternatively, two or more of the sensors can work in combination with each other. In such case, the two or more sensors can form a sensor network. The sensor(s) 130 can be operatively connected to the processor(s) 110, the data store(s) 120, and/or other elements of the vehicle 100 (including any of the elements shown in FIG. 1).

The sensor(s) 130 can include any suitable type of sensor. Various examples of different types of sensors will be described herein. However, it will be understood that the embodiments are not limited to the particular sensors described.

The sensor(s) 130 can include one or more vehicle sensors 131. The vehicle sensor(s) 131 can detect, determine, assess, monitor, measure, quantify and/or sense information about the vehicle 100 itself (e.g., position, orientation, speed, etc.). In one or more arrangements, the vehicle sensors 131 can include one or more vehicle speed sensors 132, one or more steering angle sensors 133, and/or one or more accelerometers 134. The vehicle speed sensors 132 can be any sensor configured to detect, determine, assess, monitor, measure, quantify and/or sense the speed of a vehicle, now known or later developed. The steering angle sensors 133, can be any sensor configured to detect, determine, assess, monitor, measure, quantify and/or sense the steering wheel position angle and/or rate of turn, now known or later developed. The accelerometers 134 can include any sensor, now know or later developed, configured to detect, determine, assess, monitor, measure, quantify and/or sense any information or data about acceleration forces experience by a vehicle or occupants of the vehicle, including lateral acceleration forces.

The sensor(s) 130 can include one or more environment sensors configured to detect, determine, assess, monitor, measure, quantify, acquire, and/or sense driving environment data. "Driving environment data" includes and data or information about the external environment in which a vehicle is located or one or more portions thereof. In one or more arrangements, the environment sensors can include one or more cameras, one or more radar sensors, one or more lidar sensors, one or more sonar sensors, and/or one or more ranging sensors.

As noted above, the vehicle 100 can include one or more power sources 140. The power source(s) 140 can be any power source capable of and/or configured to energize the seat actuator(s) 180. For example, the power source(s) 140 can include one or more batteries, one or more fuel cells, one or more generators, one or more alternators, one or more solar cells, and combinations thereof.

The vehicle 100 can include one or more input interfaces 150. An "input interface" includes any device, component, system, element or arrangement or groups thereof that enable information/data to be entered into a machine. The input interface(s) 150 can receive an input from a vehicle occupant (e.g. a driver or a passenger). Any suitable input interface 150 can be used, including, for example, a keypad, display, touch screen, multi-touch screen, button, joystick, mouse, trackball, microphone and/or combinations thereof.

The vehicle 100 can include one or more output interfaces 160. An "output interface" includes any device, component, system, element or arrangement or groups thereof that enable information/data to be presented to a vehicle occupant (e.g. a person, a vehicle occupant, etc.). The output interface(s) 160 can present information/data to a vehicle occupant. The output interface(s) 160 can include a display. Alternatively or in addition, the output interface(s) 160 may include an earphone and/or speaker. Some components of the vehicle 100 may serve as both a component of the input interface(s) 150 and a component of the output interface(s) 160.

The vehicle 100 can include one or more seats 170. The seat(s) 170 can be for any vehicle occupants, such for a driver or for a passenger. The seat(s) 170 can be any type of vehicle seat, now known or later developed. The one or more seats 170 can have any suitable configuration. For instance, the one or more seats 170 can include a back portion 172 and a cushion portion 174. The back portion 172 and/or the cushion portion 174 can include bolsters 173, 175, respectively.

In one or more arrangements, one or more portions of the seat(s) 170 can be configured to counteract lateral acceleration forces experienced by a vehicle occupant. To that end, the vehicle 100 can include one or more seat actuators 180. The seat actuator(s) 180 can be operatively connected to one or more of the seats 170. In one or more arrangements, the seat actuator(s) 180 can be located within a portion of the seat 170. For instance, the seat actuators(s) 180 can be located within the back portion 172 of the seat(s) 170 and/or within the cushion portion 174 of the seat(s) 170. More particularly, the seat actuator(s) 180 can be located within a bolster of the back portion 172 and/or a bolster of the cushion portion 174.

The seat actuator(s) 180 can be operatively positioned relative to one or more surfaces or portions of the seat(s) 170. The one or more surfaces can be a surface of the back portion 172, the cushion portion 174, a bolster of the back portion 172, a bolster of the cushion portion 174, and/or a headrest. When actuated, the seat actuator(s) 180 can cause the surfaces or portions of the seat 170 to morph into a different configuration.

The seat actuators 180 can be any element or combination of elements operable to modify, adjust and/or alter one or more surfaces or portions of the vehicle seat(s) 170. The seat actuators 180 may activate responsive to receiving signals or other inputs from the processor(s) 110 and/or the seat actuator control module(s) 190. The processor(s) 110 and/or the seat actuator control module(s) 190 can be operatively connected to the seat actuators 180. In FIG. 1, the seat actuator(s) 180 are generally represented by a rectangular feature. It will be understood that any suitable actuator can be used. The seat actuator(s) 180 will be described in greater detail below in connection with FIGS. 2-3.

It should be noted that the seat actuator(s) 180 can be operatively positioned so that portions of the vehicle seat 170 can be morphed in a plurality of directions. Thus, one or more seat actuators 180 can be configured to morph a first portion of the seat in a first direction, and one or more actuators 180 can be configured to morph a second portion of the seat 170 in a second direction. In some instances, the first portion and the second portion can be the same. In other instances, the first portion and the second portion can be different.

The vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data stores 120 may contain such instructions.

The vehicle 100 can include one or more modules. In one or more arrangements, the modules described herein can include artificial or computational intelligence elements, e.g., neural network, fuzzy logic or other machine learning algorithms. Further, in one or more arrangements, the modules can be distributed among a plurality of modules. In one or more arrangements, two or more of the modules described herein can be combined into a single module.

The vehicle 100 can include one or more seat actuator control modules 190. The seat actuator control module(s) 190 can include profiles and logic for actively controlling the seat actuator(s) 180 according to arrangements herein. The seat actuator control module(s) 190 can be configured to determine when the seat actuator(s) 180 should be activated or deactivated. The seat actuator control module(s) 190 can be configured to do so in any suitable manner. For instance, the seat actuator control module(s) 190 can be configured to analyze data or information acquired by the sensor(s) 130 (e.g., the vehicle speed sensor(s) 132, the steering angle sensor(s) 133, and/or the accelerometers 134). Alternatively or additionally, the seat actuator control module(s) 190 can be configured to detect user inputs (e.g., commands) provided on the input interface(s) 150. The seat actuator control module(s) 190 can retrieve raw data from the sensor(s) 130 and/or from the data store(s) 120. The seat actuator control module(s) 190 can use profiles, parameters, or setting loaded into the seat actuator control module(s) 190 and/or stored in the data store(s) 120.

The seat actuator control module(s) 190 can analyze the sensor data to determine an appropriate action for the seat(s) 170. The seat actuator control module(s) 190 can be configured to cause one or more actuators 180 to be activated or deactivated. As used herein, "cause" or "causing" means to make, force, compel, direct, command, instruct, and/or enable an event or action to occur or at least be in a state where such event or action may occur, either in a direct or indirect manner. For instance, the seat actuator control module(s) 190 can selectively permit or prevent the flow of electrical energy from the power source(s) 140 to the seat actuator(s) 180. The seat actuator control module(s) 190 can be configured send control signals or commands over a communication network 195 to the seat actuator(s) 180.

The seat actuator control module(s) 190 can be configured to cause the seat actuator(s) 180 to be selectively activated or deactivated based on one or more activation parameters. For instance, the seat actuator control module(s) 190 can be configured to compare one or more detected activation characteristics to one or more activation thresholds. If the threshold is met, then the seat actuator control module(s) 190 can cause the seat actuator(s) 180 to be activated or maintained in an activated condition. If the threshold is not met, then the seat actuator control module(s) 190 can cause the seat actuator(s) 180 to be deactivated or maintained in a deactivated or non-activated state.

For instance, there can be a vehicle speed threshold. In one or more arrangements, the vehicle speed threshold can be about 30 miles per hour (mph), 35 mph, 40 mph, 45 mph, 50 mph, 55 mph, 60 mph, 65 mph, 70 mph, or even greater, just to name a few possibilities. If a detected vehicle speed is above the vehicle speed threshold, the seat actuator control module(s) 190 can be configured to cause the seat actuator(s) 180 to be activated or maintained in an activated state. If a detected vehicle speed is below the vehicle speed threshold, the seat actuator control module(s) 190 can be configured to cause the seat actuator(s) 180 to be deactivated or maintained in a deactivated state.

As another example, there can be a steering angle threshold. In one or more arrangements, the steering angle threshold can be about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees, or about 90 degrees, just to name a few possibilities. If a detected steering angle is above the steering angle threshold, the seat actuator control module(s) 190 can be configured to cause the seat actuator(s) 180 to be activated or maintained in an activated state. If a detected steering angle is below the vehicle speed threshold, the seat actuator control module(s) 190 can be configured to cause the seat actuator(s) 180 to be deactivated or maintained in a deactivated state.

In one or more arrangements, the seat actuator control module(s) 190 can be configured to cause the seat actuator(s) 180 to be selectively activated or deactivated based on both a vehicle sped threshold and a steering angle threshold. Thus, if a detected vehicle speed is above the vehicle speed threshold and if a detected steering angle is above the steering angle threshold, the seat actuator control module(s) 190 can be configured to cause the seat actuator(s) 180 to be activated or maintained in an activated state. If a detected vehicle speed is below the vehicle speed threshold and/or if a detected steering angle is below the steering angle threshold, the seat actuator control module(s) 190 can be configured to cause the seat actuator(s) 180 to be deactivated or maintained in a deactivated state.

As another example, there can be an acceleration threshold, such as a lateral acceleration threshold. Thus, if a detected or determined lateral acceleration of the vehicle is above the lateral acceleration threshold, the seat actuator control module(s) 190 can be configured to cause the seat actuator(s) 180 to be activated or maintained in an activated state. If a detected steering angle is below the lateral acceleration threshold, the seat actuator control module(s) 190 can be configured to cause the seat actuator(s) 180 to be deactivated or maintained in a deactivated state.

In some instances, the seat actuator control module(s) 190 can be configured to cause the seat actuator(s) 180 to be selectively activated or deactivated based on user inputs (e.g., commands). For instance, a user can provide an input on the input interface(s) 150. The input can be to activate or deactivate the seat actuator(s) 180. The seat actuator control module(s) 190 can be configured to cause the seat actuator(s) 180 to be deactivated or activated in accordance with the user input.

The seat actuator control module(s) 190 can be configured to control a plurality of seats 170. The seat actuator control module(s) 190 can be configured to control each seat 170 individually. Thus the control of one seat 170 is independent of the control of the other seats 170. Alternatively, the seat actuator control module(s) 190 can be configured to control the plurality of seat(s) 170 collectively. Thus, each seat 170 can be activated or deactivated at substantially the same time, to the same degree of actuations, and/or in substantially the same manner.

It should be noted that the seat actuator control module(s) 190 can be configured to determine the direction is which lateral acceleration will occur. Thus, if the seat actuator control module(s) 190 determines that the direction of lateral acceleration will be to the right, the seat actuator control module(s) 190 can activate the seat actuator(s) 180 on the opposite side (i.e., left side) of the seat 170. Similarly, if the seat actuator control module(s) 190 determines that the direction of lateral acceleration will be to the left, the seat actuator control module(s) 190 can activate the seat actuator(s) 180 on the opposite (i.e., right) side of the seat 170.

The various elements of the vehicle 100 can be communicatively linked to one another or one or more other elements through one or more communication networks 195. As used herein, the term "communicatively linked" can include direct or indirect connections through a communication channel, bus, pathway or another component or system. A "communication network" means one or more components designed to transmit and/or receive information from one source to another. The data store(s) 120 and/or one or more other elements of the vehicle 100 can include and/or execute suitable communication software, which enables the various elements to communicate with each other through the communication network and perform the functions disclosed herein.

The one or more communication networks 195 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Figure 2A:
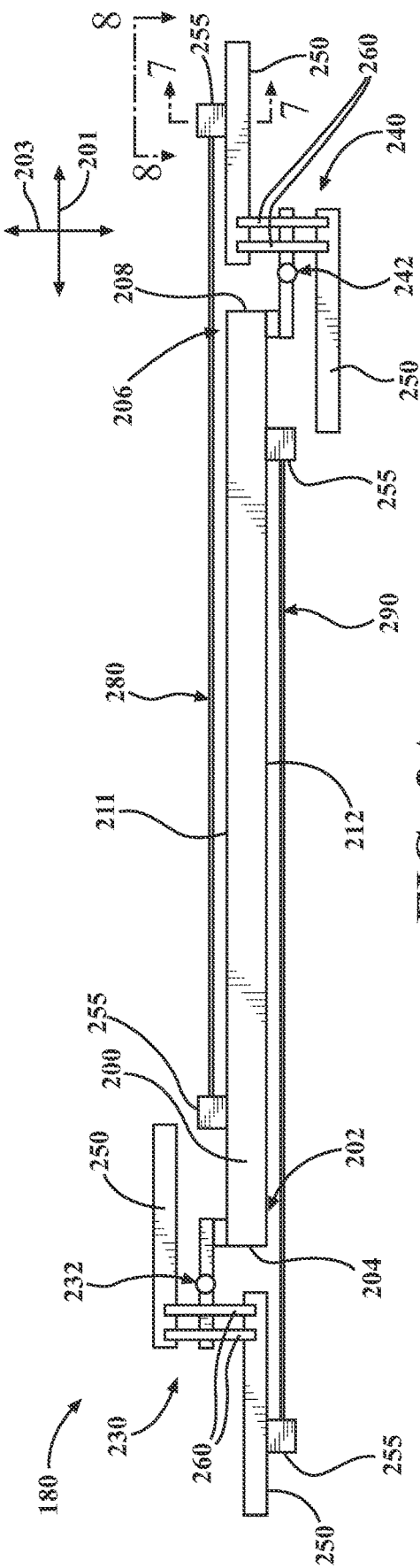
FIG. 2A depicts an example of an actuator, showing a non-activated configuration.
Figure 2B:
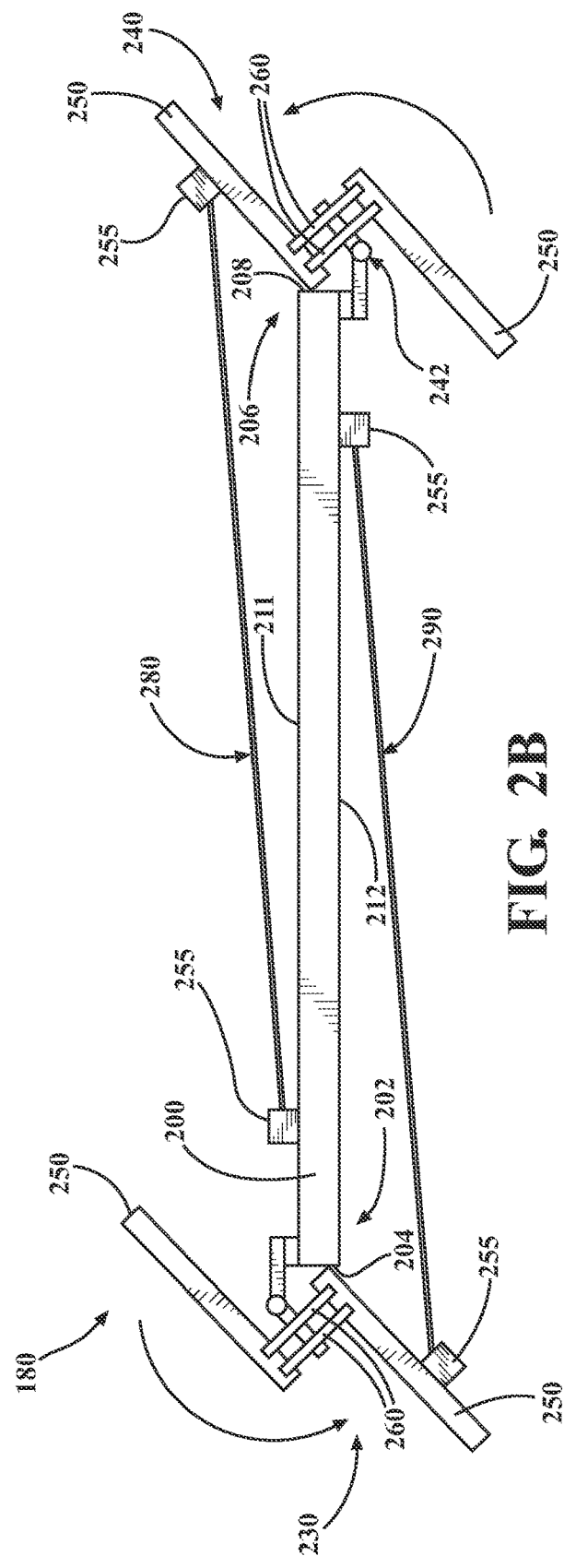
FIG. 2B depicts an example of the actuator, showing an activated configuration.

Referring to FIGS. 2A-2B, a view of one example of the seat actuator 180 is shown. The seat actuator 180 can have a main body member 200. The main body member 200 can have an elongated body. The main body member 200 can have a first end region 202. The first end region 202 can include a first end 204. The main body member 200 can include a second end region 206. The second end region can include a second end 208. The main body member 200 can have a first side 211 and a second side 212.

The main body member 200 can have any suitable overall shape. In the example shown in FIGS. 2A and 2B, the main body member 200 can have a substantially rectangular cross-section shape. The main body member 200 can be any suitable shape overall, such as substantially rectangular, substantially oval, substantially circular, or substantially polygonal. The main body member 200 can extend substantially linearly. The main body member 200 can be substantially planar.

The main body member 200 can be made of any suitable material. For example, the main body member 200 can be made of metal or plastic.

The seat actuator 180 can have a first end member 230 and a second end member 240. The first end member 230 can be operatively connected to the first end region 202 of the main body member 200. More particularly, the first end member 230 can be pivotably connected to the first end region 202 of the main body member 200, such as by one or more first hinge members 232. The second end member 240 can be operatively connected to the second end region 206 of the main body member 200. More particularly, the second end member 240 can be pivotably connected to the second end region 206 of the main body member 200, such as by one or more second hinge members 242. The one or more first hinge members 232 and the one or more second hinge members 242 can be any type of hinge, now known or later developed.

The one or more first hinge members 232 and the one or more second hinge members 242 can be configured to allow any suitable range of motion. For instance, according to one or more arrangements, the one or more first hinge members 232 and the one or more second hinge members 242 can both allow the first end member 230 and the second end member 240 to have a pivoting range from 0 to at least about 40 degrees, at least about 45 degrees, at least about 50 degrees, at least about 55 degrees, at least about 60 degrees, at least about 65 degrees, at least about 70 degrees, at least about 75 degrees, at least about 80 degrees, at least about 85 degrees, at least about 90 degrees, just to name a few possibilities. In one or more arrangements, the actuator 180 can be configured so that the first end member 230 and the second end member 240 pivot in the same direction. For instance, in the arrangements shown in FIGS. 2A and 2B, the first end member 230 and the second end member 240 can both pivot in a counter clockwise direction. The actuator 180 can be configured such that the first end member 230 and the second end member 240 pivot toward opposite sides of the main body member 200 when actuated. For example, the first end member 230 can rotate in a counter clockwise direction toward the second side 212 of the main body member 200, and the second end member 240 can rotate in a counter clockwise direction toward the first side 211 of the main body member 200.

The actuator 180 can have a first direction 201 and a second direction 203. The first direction 201 can be substantially perpendicular to the second direction 203. The first direction 201 can be a direction that extends through the first end member 230 and the second end member 240. The first direction 201 can extend substantially parallel to the main body member 200. The first and second end members 230, 240 can be configured so that, when the actuator 180 is activated, the first and second end members 230, 240 cause the overall dimension of the actuator 180 in the second direction 203 to increase.

The first and second end members 230, 240 can be substantially identical to each other. Alternatively, the first and second end members 230, 240 can be different from each other in one or more respects. The first and second end members 230, 240 can be made of any suitable material, such as metal or plastic. In one or more arrangements, the first and second end members 230, 240 can be made of the same material as the main body member 200.

One non-limiting example of the first and second end members 230, 240 is shown in FIGS. 2A and 2B. The first and second end members 230, 240 can have a generally Z-shaped configuration. The first and second end members 230, 240 can include a pair of longitudinal members 250. The pair of longitudinal members 250 can be spaced from each other. The pair of longitudinal members 250 can be substantially parallel to each other. The pair of longitudinal members 250 can be operatively connected by one or more cross members 260. The longitudinal members 250 and the cross member(s) 260 can be operatively connected in any suitable manner, such as by one or more fasteners, one or more adhesives, one or more welds, one or more forms of mechanical engagement, and/or one or more other forms of connection.

In one or more arrangements, the longitudinal members 250 can be substantially parallel to each other. In one or more arrangements, the cross member(s) 260 can be substantially perpendicular to the longitudinal members 250. In other arrangements, the cross member(s) 260 can be angled at an acute angle relative to the longitudinal members 250. In the non-activated configuration shown in FIG. 2A, the longitudinal members 250 can be substantially parallel to the main body member 200. Further, one of the longitudinal members 250 of the first and second end members 230, 240 can be substantially aligned with the main body member 200 when in the non-activated configuration.

As noted above, the first and second end members 230, 240 can be pivotably connected to the main body member by one or more first hinge members 232 and one or more second hinge members 242, respectively. The first hinge member(s) 232 and the second hinge member(s) 242 can be operatively connected to any suitable portion of the first and second end members 230, 240. For instances, the first hinge member(s) 232 and the second hinge member(s) 242 can be operatively connected to the cross member 260 of the first and second end members 230, 240.

The actuator 180 can include a first shape memory material connecting member 280 and a second shape memory material connecting member 290. "Shape memory material" is a material that changes shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the first shape memory material connecting member and a second shape memory material connecting member can be shape memory material wires. As an example, the first shape memory material connecting member and the second shape memory material connecting member can be shape memory alloy wires. Thus, when an activation input (i.e., heat) is provided to the shape memory alloy wires, the wires can contract. The shape memory alloy wires can be heated in any suitable manner, now known or later developed. For instance, the shape memory alloy wires can be heated by the Joule effect by passing electrical current through the wires. In some instances, arrangements can provide for cooling of the shape memory alloy wires, if desired, to facilitate the return of the wires to a non-activated configuration.

The wires can have any suitable characteristics. For instance, the wires can be high temperature wires with austenite finish temperatures from about 90 degrees Celsius to about 110 degrees Celsius. The wires can have any suitable diameter. For instance, the wires can be from about 0.2 millimeters (mm) to about 0.7 mm, from about 0.3 mm to about 0.5 mm, or from about 0.375 millimeters to about 0.5 millimeters in diameter. In some arrangements, the wires can have a stiffness of up to about 70 gigapascals. The wires can be configured to provide an initial moment of from about 300 to about 600 N·mm, or greater than about 500 N·mm, where the unit of newton millimeter (N·mm) is a unit of torque (also called moment) in the SI system. One newton meter is equal to the torque resulting from a force of one newton applied perpendicularly to the end of a moment arm that is one meter long. In various aspects, the wires can be configured to transform in phase causing the first and second end members 230, 240 to rotate from non-activated position to an activated position in about 3 seconds or less, about 2 seconds or less, about 1 second or less, or about 0.5 second or less.

The wires can be made of any suitable shape memory material, now known or later developed. Different materials can be used to achieve various balances, characteristics, properties, and/or qualities. As an example, an SMA wire can include nickel-titanium (Ni—Ti, or nitinol). One example of a nickel-titanium shape memory alloy is FLEXINOL, which is available from Dynaolloy, Inc., Irvine, Calif. As further example, the SMA wires can be made of Cu—Al—Ni, Fe—Mn—Si, or Cu—Zn—Al.

The SMA wires can be configured to increase or decrease in length upon changing phase, for example, by being heated to a phase transition temperature TSMA. Utilization of the intrinsic property of SMA wires can be accomplished by using heat, for example, via the passing of an electric current through the SMA wire in order provide heat generated by electrical resistance, in order to change a phase or crystal structure transformation (i.e., twinned martensite, detwinned martensite, and austenite) resulting in a lengthening or shortening the SMA wire. In some implementations, during the phase change, the SMA wire can experience a decrease in length of from about 2 to about 8 percent, or from about 3 percent to about 6 percent, and in certain aspects, about 3.5 percent, when heated from a temperature less than the TSMA to a temperature greater than the TSMA.

Other active materials may be used in connected with the arrangements described herein. For example, other shape memory materials may be employed. Shape memory materials, a class of active materials, also sometimes referred to as smart materials, include materials or compositions that have the ability to remember their original shape, which can subsequently be recalled by applying an external stimulus, such as an activation signal.

While the first shape memory material connecting member 280 and a second shape memory material connecting member 290 are described, in one implementation, as being wires, it will be understood that the first shape memory material connecting member 280 and a second shape memory material connecting member 290 are not limited to being wires. Indeed, it is envisioned that suitable shape memory materials may be employed in a variety of other forms, such as strips, small sheets or slabs, cellular and lattice structures, helical or tubular springs, braided cables, tubes, or combinations thereof. In some arrangements, the first shape memory material connecting member 280 and a second shape memory material connecting member 290 may include an insulating coating.

The first shape memory material connecting member 280 can be operatively connected to the second end member 240 and to the main body member 200. More particularly, first shape memory material connecting member 280 can be operatively connected to a longitudinal member 250 of the second end member 240 and to the first side 211 of the main body member 200. The second shape memory material connecting member 290 can be operatively connected to the first end member 230 and to the main body member 200. More particularly, the second shape memory material connecting member 290 can be operatively connected to the first end member 230 and to the main body member 200. The first and second shape memory material connecting members 280, 290 can be operatively connected to these structures in any suitable manner, including by one or more fasteners, one or more adhesives, one or more welds, and/or one or more forms of mechanical engagement, just to name a few possibilities.

In some arrangements, the first and second shape memory material connecting members 280, 290 can be directly connected to the main body member 200 and to the respective end members 230, 240. In some arrangements, the main body member 200 can include one or more posts 255, and the first and second end members 230, 240 can include posts 255. In some arrangements, the one or more posts 255 can allow the first and second shape memory material connecting members 280, 290 to be spaced from the main body member 200 and the first and second end members 230, 240. Further, the placement of the one or more posts 255, particularly relative to the pivot point of the first and second end members 230, 240, can affect the torque and/or the stroke of the actuator 180 overall.

Figure 7A:
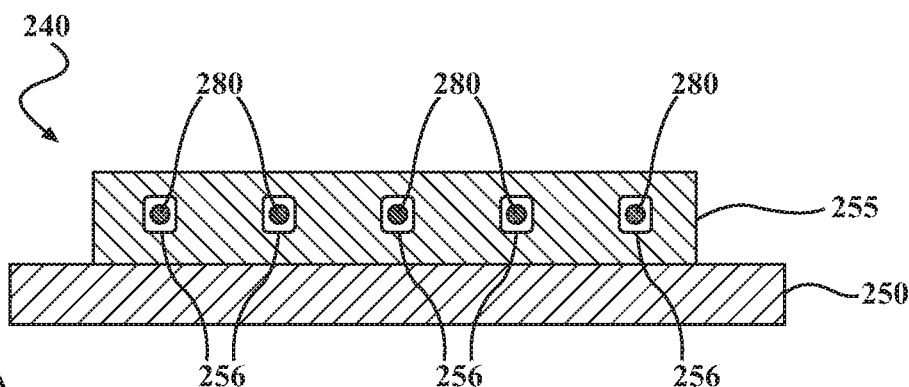
FIG. 7A is a cross-sectional view of a portion of an end member of the actuator, viewed along line 7-7 of FIG. 2A.
Figure 7B:
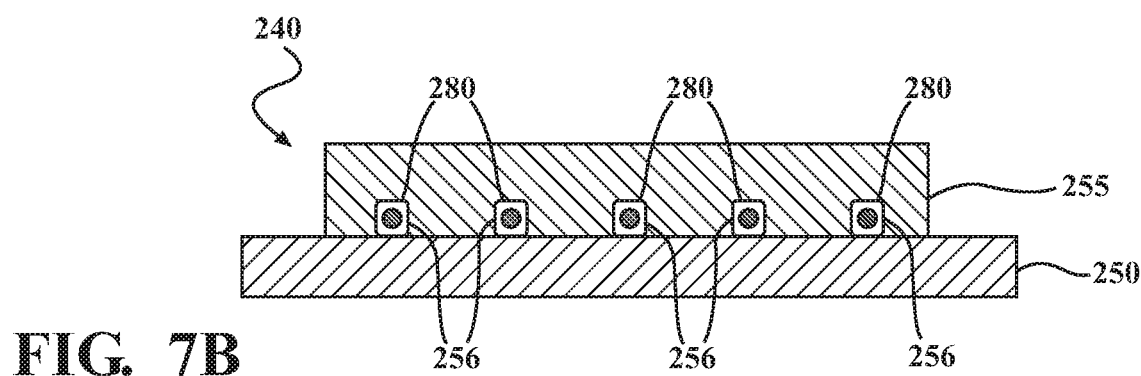
FIG. 7B is a cross-sectional view of a portion of an end member of the actuator, viewed along line 7-7 of FIG. 2A.
Figure 8:
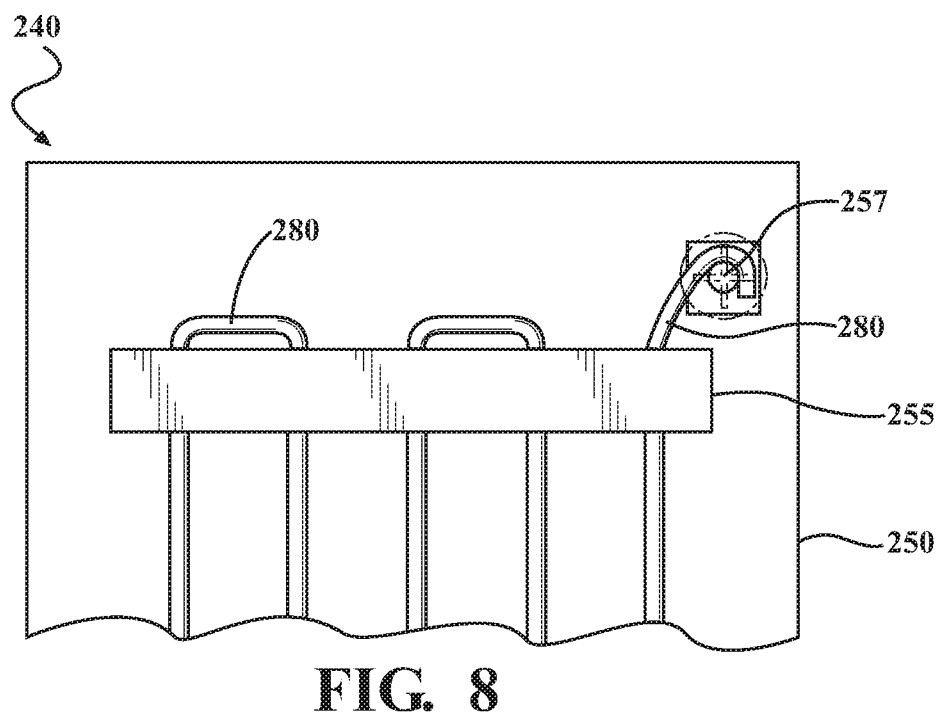
FIG. 8 is a view of a portion of the end member of the actuator, viewed along line 8-8 of FIG. 2A.

Referring to FIGS. 7A, 7B, and 8, a portion of the second end member 240 is shown. It will be understood that this discussion applies equally to the first end member 230, the posts 255 provided on the main body member 200, and to the second shape memory material connecting members 290. In some instances, one or more passages 256 can be defined within the post 255, as is shown in FIG. 7A. In other instances, one or more passages 256 can be defined by the posts 255 and by the longitudinal member 250, as is shown in FIG. 7B. The passages 256 can be sized, shaped, and/or configured to allow passages of the shape memory material connecting members.

Referring to FIG. 8, the first shape memory material connecting member 280 can extend through one of the passages 256 on a front side of the post 255. The first shape memory material connecting member 280 can bend back to enter the neighboring passage 256 from the back side of the post 255. From there, the first shape memory material connecting member 280 can extend to the post 255 on the main body member 200 where a similar arrangement can occur. This winding can repeat any number of times. When the first shape memory material connecting member 280 is a single wire, such winding can create a serpentine pattern of the first shape memory material connecting member 280. Of course, in other arrangements, the first shape memory material connecting member 280 can be a plurality of individual wires, or it can be a single wire that does not wind.

The end of the first shape memory material connecting member 280 can be connected to any suitable structure (e.g., the post 255, the longitudinal member 250, etc.) in any suitable manner. In the arrangement shown in FIG. 8, the end of the shape memory material connecting member 280 can be connected to the longitudinal member 250 by one or more fasteners 257. While FIG. 8 shows the first shape memory material connecting member 280, it will be understood that the description is equally applicable to the second shape memory material connecting member 290.

It should be noted that, in some arrangements, the first and second shape memory material connecting members 280, 290 can be single straight wires. Alternatively, the first and second shape memory material connecting members 280, 290 can be single wires arranged in a serpentine manner (which would span into and out of the page in FIGS. 2A and 2B). Still alternatively, first and second shape memory material connecting members 280, 290 can include a plurality of individual straight wires.

Further, in some instances, the actuator 180 can include an outer skin enclosing the above described structures. The outer skin can be flexible to accommodate different configurations of the actuator 180.

The seat actuator 180 can have a non-activated configuration and an activated configuration. Each of these configurations will be described in turn. FIG. 2A shows an example of a non-activated configuration of the seat actuator 180. In such case, an activation input is not provided to the first and second shape memory material connecting members 280, 290. For instance, when the first and second shape memory material connecting members 280, 290 are shape memory material wires, an activation input (e.g., electrical current) to heat the wires is not provided. Thus, the first and second shape memory material connecting members 280, 290 are in a neutral or non-activated condition. In the non-activated configuration, the first and second end members 230, 240 can be generally aligned with the main body member 200. The actuator 180 can have a width in the second direction 203.

FIG. 2B shows an example of an activated mode of the seat actuator 180. In the actuated mode, an activation input can be provided to the first and second shape memory material connecting members 280, 290. As a result, the first and second shape memory material connecting members 280, 290 can contract. This contraction causes the first shape memory material connecting member 280 to pull the second end member 240 toward the main body member 200, and it causes the second shape memory material connecting member 290 to pull the first end member 230 toward the main body member 200. The first hinge member(s) 232 and the second hinge member(s) 242 can facilitate such movement. When the first and second end members 230, 240 are rotated into their activated position, it will be appreciated that the overall size of the actuator in the second direction 203 increases. As a result, the first and second end members 230, 240 can push on portions of the vehicle seat 170 to cause the vehicle seat 170 to morph. It should be noted that the first and second shape memory material connecting members 280, 290 can be activated simultaneously, or they can be activated independently of each other.

It will be appreciated that, when the activation input is discontinued, the first and second shape memory material connecting members 280, 290 can substantially returns to a neutral or non-activated configuration, such as shown in FIG. 2A. As a result, the vehicle seat 170 will also return to its non-activated configuration.

Figure 3A:
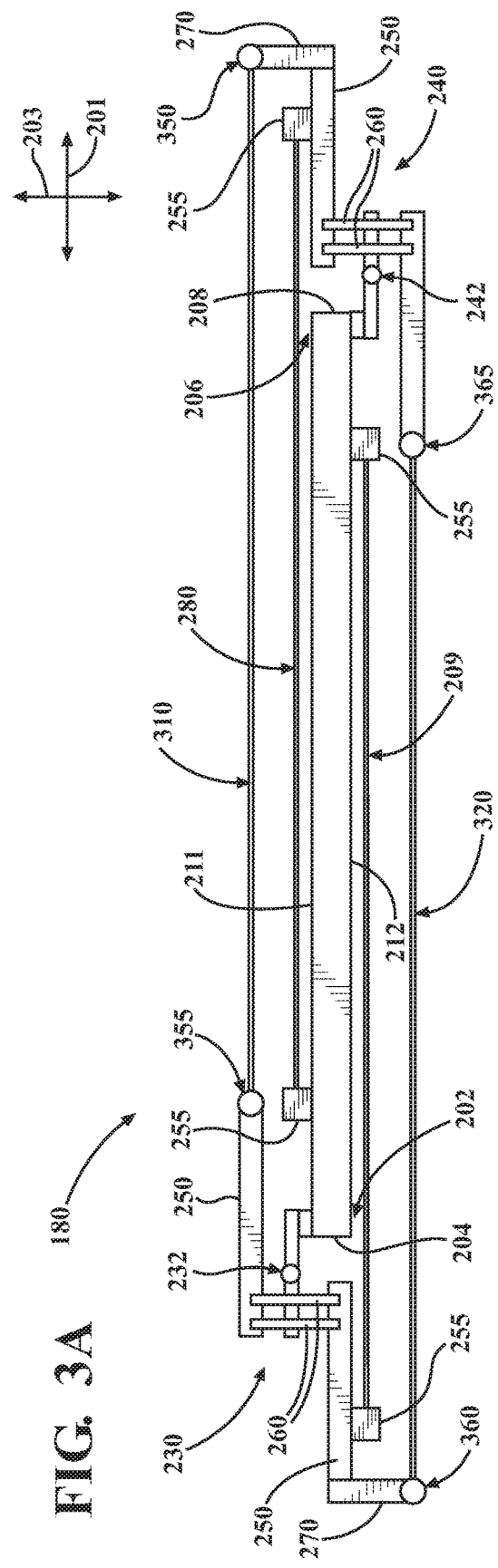
FIG. 3A depicts an example of an actuator, showing a non-activated configuration.
Figure 3B:
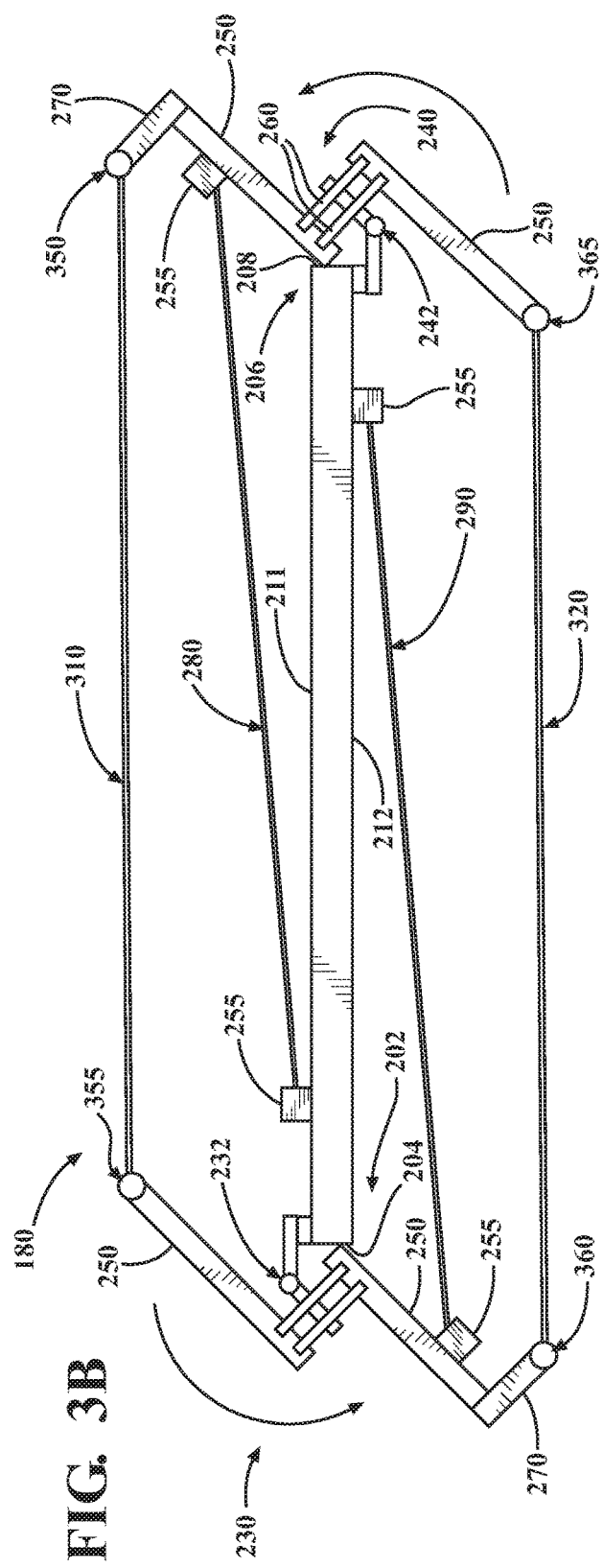
FIG. 3B depicts an example of the actuator, showing an activated configuration.

Referring to FIGS. 3A and 3B, another example of the seat actuator 180 is shown. The seat actuator 180 can include many if not all of the same elements as the seat actuator 180 shown in FIGS. 2A-2B. Thus, the above description of the seat actuator 180 made in connection with FIGS. 2A-2B applies equally to the actuator 180 shown in FIGS. 3A-3B.

Further, the seat actuator 180 can include a first membrane 310 and/or a second membrane 320. The first membrane 310 and the second membrane 320 can be made of any suitable materials. For instance, the first membrane 310 and the second membrane 320 can be a plastic sheet. The first and second membranes 310, 320 can create a larger outer envelope for the actuator 180.

The first membrane 310 can be operatively connected to the first end member 230 and the second end member 240. More particularly, the first membrane 310 can be operatively connected to a longitudinal member 250 of the first end member 230 and to a longitudinal member 250 of the second end member 240 on the first side 211 of the main body member 200. In one or more arrangements, the first membrane 310 can be pivotably connected to the first end member 230 and/or the second end member 240. In the example shown in FIG. 3A, the first membrane 310 can be pivotably connected to the second end member 240 by one or more hinge members 350. In some arrangements, the first membrane 310 can also be pivotably connected to the first end member 230 by one or more hinge members 355.

The second membrane 320 can be operatively connected to the first end member 230 and the second end member 240. More particularly, the second membrane 320 can be operatively connected to a longitudinal member 250 of the first end member 230 and to a longitudinal member 250 of the second end member 240 on the second side 212 of the main body member 200. In one or more arrangements, the second membrane 320 can be pivotably connected to the first end member 230 and/or the second end member 240. In the example shown in FIG. 3A, the second membrane 320 can be pivotably connected to the first end member 230 by one or more hinge members 360. In some arrangements, the second membrane 320 can also be pivotably connected to the second end member 240 by one or more hinge members 365.

In some instances, the longitudinal members 250 can include post 270 at or near the end of the respective longitudinal member 250. The first membrane 310 can be operatively connected to the post 270 of the second end member 240, and the second membrane 320 can be operatively connected to the post of the first end member 230. In such cases, the posts 270 can help to keep the first membrane 310 and the second membrane 320 substantially parallel to the main body member 200 in the non-activated condition, as shown in FIG. 3A. The posts can further push the material of the vehicle seat 170 to facilitate the morphing of a portion of the vehicle seat 170. It should be noted that these posts 270 may also be provided in the arrangements shown in FIGS. 2A and 2B.

The seat actuator 180 can have a non-activated configuration and an activated configuration. Each of these configurations will be described in turn. FIG. 3A shows an example of a non-activated configuration of the seat actuator 180, and FIG. 3B shows an example of the activated configuration of the seat actuator 180. The above discussion of these configurations made in connection with FIGS. 2A and 2B applies equally to the actuator in FIGS. 3A and 3B.

In the non-activated configuration, the first and second membranes 310, 320 can be substantially parallel to the main body member 200. The actuator 180 can have a width in the second direction 203.

In the activated configuration, the first and second membranes 310, 320 can move with the movement of the first and second end members 230, 240. The hinge members 350, 360 can accommodate such movement. When the first and second end members 230, 240 are rotated into their activated position, it will be appreciated that the overall size of the actuator in the second direction 203 increases. As a result, the first and second membranes 310, 320, in addition to other portions of the actuator 180, can push on portions of the vehicle seat 170 to cause the vehicle seat 170 to morph.

Figure 4A:
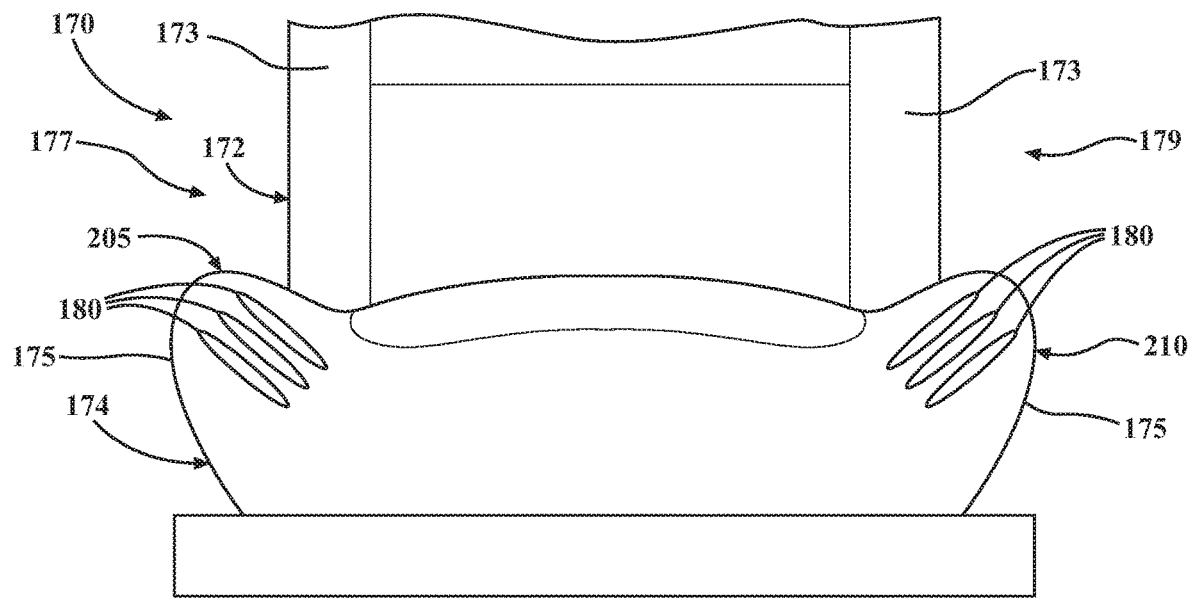
FIG. 4A is an example of a portion of a vehicle seat, showing a bolster in a non-activated configuration.
Figure 4B:
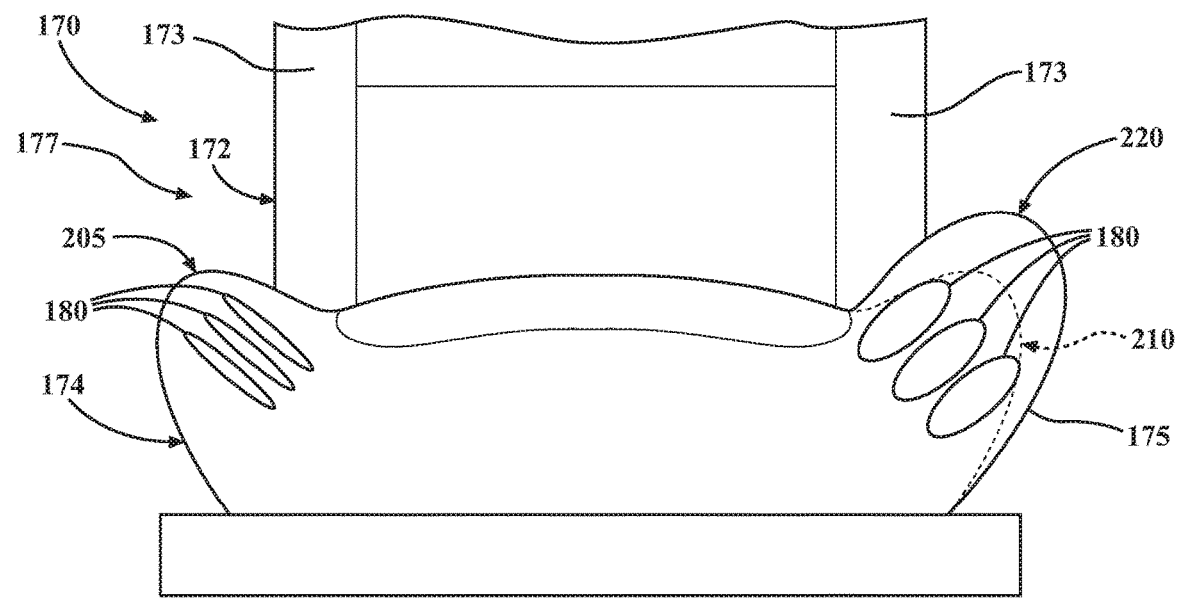
FIG. 4B is an example of the portion of the vehicle seat, showing the bolster in an activated configuration.

Referring to FIGS. 4A-4B, an example of a portion of a vehicle seat is shown. For purposes of this example, the seat actuator(s) 180 will be described in connection with the cushion portion 174 of the vehicle seat 170, but it will be understood that this description applies equally to the seat actuator(s) 180 in connection with the back portion 172 of the vehicle seat 170.

The seat actuator(s) 180 can be operatively positioned within the vehicle seat 170 relative to one or more surfaces or portions of the seat(s) 170. The surfaces can be a surface of the back portion 172, the cushion portion 174, the bolster 173 of the back portion 172, and/or the bolster 175 of the cushion portion 174. When actuated, the seat actuator(s) 180 can cause the surfaces or portions of the seat to morph into a different configuration. In the arrangements shown herein, it should be noted that the seat actuator 180 can be a single actuator, a single stack of a plurality of actuators, a plurality of actuators, a plurality of stacks of actuators, and/or combinations thereof.

FIG. 4A shows an example of the seat actuator(s) 180 in a non-activated condition or a deactivated condition. General representations of the seat actuator(s) 180 are shown in FIGS. 4A and 4B for purposes of clarity. In this example, there can be a plurality of actuators 180 in the bolster 175 on both a first side 177 and a second side 179 of the seat 170. The bolster 175 on the first side 177 can have a non-activated configuration 205, and the bolster 175 on the second side 179 can have a non-activated configuration 210. The non-activated configurations 205, 210 can be substantially mirror images of each other.

FIG. 4B shows an example of the seat actuators 180 on the first side 177 remaining in the non-activated condition or a deactivated condition; however, the seat actuators 180 on the second side 179 are in an activated condition. As a result, the bolster 175 on the second side 179 can have an activated configuration 220. As shown in FIG. 4B, the overall size of the bolster 175 on the second side 179 has become enlarged overall. It will be appreciated that the bolster 175 in the activated configuration 220 can provide additional resistance to lateral acceleration of a vehicle occupant in that direction, such as when a vehicle is turning.

Now that the various potential systems, devices, elements and/or components of the vehicle 100 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 5:
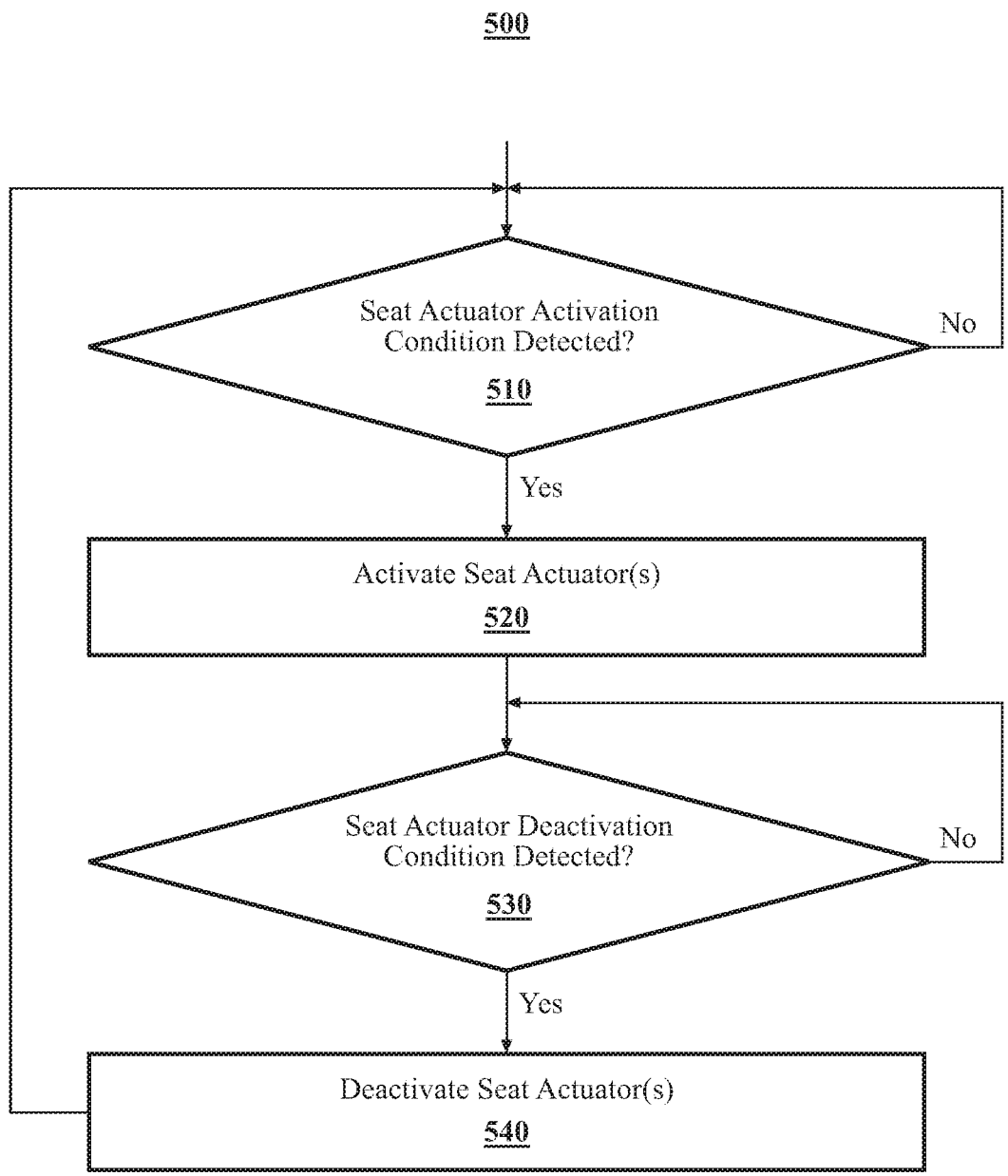
FIG. 5 is an example of a method of selectively morphing a portion of a vehicle seat.

Turning to FIG. 5, an example of a method 500 is shown. For the sake of discussion, the method 500 can begin with the seat actuator(s) 180 in a non-activated mode, such as is shown in FIG. 4A. In the non-activated mode, electrical energy from the power source(s) 140 is not supplied to the seat actuator(s) 180. At block 510, it can be determined whether a seat activation condition has been detected. The seat activation condition may be detected by the seat actuator control module(s) 190, the processor(s) 110, and/or one or more sensor(s) 130. For instance, the seat actuator control module(s) 190, the processor(s) 110, and/or one or more sensor(s) 130 can determine that data acquired by the vehicle sensor(s) 131 meets a seat activation condition. For instance, the seat actuator control module(s) 190, the processor(s) 110, and/or one or more sensor(s) 130 can determine whether the current vehicle speed and/or the current steering angle meet respective seat activation threshold. Alternatively or additionally, the seat actuator control module(s) 190, the processor(s) 110, and/or one or more sensor(s) 130 can determine whether the current lateral acceleration meets respective seat activation threshold. Alternatively or in addition, the seat actuator control module(s) 190, the processor(s) 110, and/or one or more sensor(s) 130 can detect a user input indicating that the interface should be activated. The user input can be provided via the input interface(s) 150.

If a seat activation condition is not detected, the method 500 can end, return to block 510, or proceed to some other block. However, if a seat activation condition is detected, then the method can proceed to block 520. At block 520, the seat actuator(s) 180 can be activated. Of course, the seat actuator control module(s) 190 and/or the processor(s) 110 may only actuate certain individual seat actuator(s) 180 while leaving others in a non-activated state. Thus, the seat actuator control module(s) 190 and/or the processor(s) 110 can cause or allow the flow of electrical energy from the power sources(s) 140 to the seat actuator(s) 180.

When activated, the seat actuator(s) 180 can morph to an activated shape, such as is shown in FIG. 2B or 3B. The seat actuator(s) 180 can interact with portions of the vehicle seat 170 to cause a portion of the vehicle seat 170 to morph into an activated configuration, such as is shown in FIG. 4B. The method can continue to block 530.

At block 530, it can be determined whether a seat deactivation condition has been detected. The seat deactivation condition may be detected by the seat actuator control module(s) 190, such as based on data acquired by the sensor(s) 130 and/or by detecting a user input or the cessation of a user input. If a seat deactivation condition is not detected, the method 500 can return to block 530, or proceed to some other block. However, if a deactivation condition is detected, then the method can proceed to block 540. At block 540, the seat actuator(s) 180 can be deactivated. Thus, the seat actuator control module(s) 190 and/or the processor(s) 110 can cause the flow of electrical energy from the power sources(s) 140 to the seat actuator(s) 180 to be discontinued.

The method 500 can end. Alternatively, the method 500 can return to block 510 or some other block.

Figure 6A:
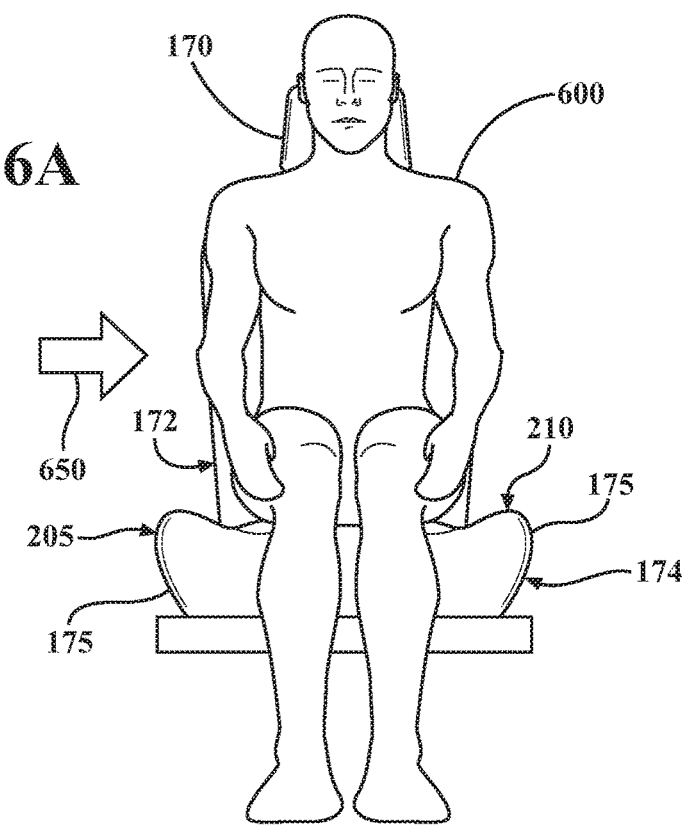
FIG. 6A shows an example of an occupant in a vehicle seat when the seat actuators are in a non-activated configuration.
Figure 6B:
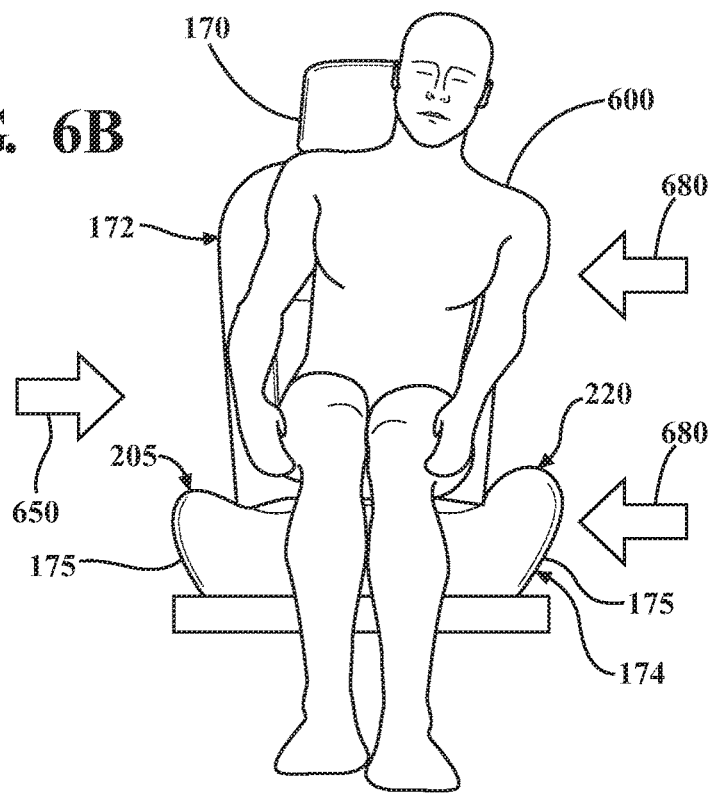
FIG. 6B shows an example of the occupant in the vehicle seat when the seat actuators are in the activated configuration.

A non-limiting example of the operation of the arrangements described herein will now be presented in connection to FIGS. 6A-6B. These figures show an occupant 600 in the vehicle seat 170. The vehicle seat 170 can include the seat actuators 180, though the seat actuators 180 are not shown in FIGS. 6A-6B. FIG. 6A shows an example of an occupant in a vehicle seat when the seat actuators are in a non-activated configuration. As the vehicle makes a right turn, particularly at higher speeds, lateral acceleration forces 650 can act upon the vehicle and/or occupant 600. As a result, the occupant 600 may actually be or may feel like he or she is being pushed, moved, and/or forced at least to the left due to such forces.

Accordingly, the seat actuators 180 on the left side of the vehicle seat 170 (such as in the can be activated can be moved to the right toward the right lateral side 104 of the vehicle 100. FIG. 6B shows an example of the occupant in the vehicle seat when the seat actuators are in the activated configuration. As can be seen the bolster 175 of the cushion portion 174 can become enlarged as a result of the actuation of the seat actuators 180 in such location. Similarly, though not visible in FIG. 6B, the bolster 173 of the back portion 172 can become enlarged as a result of the actuation of the seat actuators 180. The activated configuration for the bolsters 173, 175 can provide lateral support 680 to the occupant 600, which can help to reduce the effects experienced by the occupant 600 due to the lateral acceleration forces 650.

It will be appreciated that arrangements described herein can provide numerous benefits, including one or more of the benefits mentioned herein. For example, arrangements described herein can provide lateral support for a vehicle occupant in conditions in which high lateral acceleration forces are experienced by the occupant. Arrangements described herein can also allow a vehicle seat to be selectively morphed. Thus, the vehicle seat can be in a normal configuration in most driving conditions and morphed when needed, thereby increasing occupant comfort. Arrangements described herein can avoid the use of large and complicated gears and actuators, thereby enabling more compact designs and packaging. Arrangements described here can provide for more efficient use of power.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. An actuator comprising:
a main body member, the main body member having a first end region including a first end and a second end region including a second end, the main body member having a first side and a second side;
a first end member, the first end member including a first fixed portion and a first pivoting portion, the first pivoting portion being pivotably connected to the first fixed portion, the first fixed portion being connected to the first side of the main body member in the first end region;
a first shape memory material connecting member connecting the first pivoting portion of the first end member to the main body member, the first shape memory material connecting member being located on one of the first side or the second side of the main body member;
a second end member, the second end member including a second fixed portion and a second pivoting portion, the second pivoting portion being pivotably connected to the second fixed portion, the second fixed portion being connected to the second side of the main body member in the second end region; and
a second shape memory material connecting member connecting the second pivoting portion of the second end member to the main body member, the second shape memory material connecting member being located on an opposite one of the first side or the second side of the main body member from the first shape memory material connecting member,
the actuator having a first dimension and a second dimension, the first dimension being substantially perpendicular to the second dimension, the first dimension being in a direction that extends through the first end member and the second end member,
the actuator being configured such that, when an activation input is provided to the first and second shape memory material connecting members, the first and second shape memory material connecting members contract, causing the first pivoting portion of the first end member and the second pivoting portion of the second end member to pivot, thereby causing the actuator to morph into an activated configuration in which the second dimension increases.

2. The actuator of claim 1, further including a first membrane, wherein the first membrane is operatively connected to the first end member and the second end member on the first side of the main body member.

3. The actuator of claim 2, further including a second membrane, wherein the second membrane is operatively connected to the first end member and the second end member on the second side of the main body member, and wherein the first side is opposite the second side.

4. The actuator of claim 2, wherein the first membrane is operatively connected to the second end member by one or more hinge members.

5. The actuator of claim 1, wherein at least one of the first shape memory material connecting member, and wherein the second shape memory material connecting member is a shape memory alloy wire.

6. The actuator of claim 1, wherein the actuator is further configured such that, when the activation input to the first and second shape memory material connecting members is discontinued, the first and second shape memory material connecting members substantially return to a non-activated configuration.

7. A vehicle seat system comprising:
a vehicle seat; and
one or more actuators located within the vehicle seat, the one or more actuators being operatively positioned such that, when activated, the one or more actuators cause a portion of the vehicle seat to morph into an activated configuration, the one or more actuators including:
a main body member, the main body member having a first end region including a first end and a second end region including a second end, the main body member having a first side and a second side;
a first end member, the first end member including a first fixed portion and a first pivoting portion, the first pivoting portion being pivotably connected to the first fixed portion, the first fixed portion being connected to the first side of the main body member in the first end region;
a first shape memory material connecting member connecting the first pivoting portion of the first end member to the main body member, the first shape memory material connecting member being located on one of the first side or the second side of the main body member;
a second end member, the second end member including a second fixed portion and a second pivoting portion, the second pivoting portion being pivotably connected to the second fixed portion, the second fixed portion being connected to the second side of the main body member in the second end region; and
a second shape memory material connecting member connecting the second pivoting portion of the second end member to the main body member, the second shape memory material connecting member being located on an opposite one of the first side or the second side of the main body member from the first shape memory material connecting member,
the actuator having a first dimension and a second dimension, the first dimension being substantially perpendicular to the second dimension, the first dimension being in a direction that extends through the first end member and the second end member,
the actuator being configured such that, when an activation input is provided to the first and second shape memory material connecting members, the first and second shape memory material connecting members contract, causing the first pivoting portion of the first end member and the second pivoting portion of the second end member to pivot, thereby causing the actuator to morph into the activated configuration in which the second dimension increases.

8. The vehicle seat system of claim 7, wherein the portion of the vehicle seat is a seat cushion or a bolster of a seat cushion.

9. The vehicle seat system of claim 7, wherein the portion of the vehicle seat is a seat back or a bolster of the seat back.

10. The vehicle seat system of claim 7, further including:
one or more power sources operatively connected to the one or more actuators; and
one or more processors operatively connected to control a supply of electrical energy from the one or more power sources to the one or more actuators, wherein the one or more processors are programmed to initiate executable operations comprising:

determine, based on sensor data acquired by one or more sensors, whether a seat actuator activation condition is met; and
responsive to determining that the seat actuator activation condition is met, causing electrical energy to be supplied to one or more of the one or more actuators from the one or more power sources, whereby the one or more of the one or more actuators are activated to cause the portion of the vehicle seat to morph into the activated configuration.

11. The vehicle seat system of claim 10, further including one or more sensors operatively connected to the one or more processors, wherein the one or more sensors are configured to acquire sensor data about vehicle speed or steering wheel angle, and wherein the seat actuator activation condition is a vehicle speed threshold or a steering angle threshold.

12. The vehicle seat system of claim 10, further including one or more sensors operatively connected to the one or more processors, wherein the one or more sensors are configured to acquire sensor data about lateral acceleration, and wherein the seat actuator activation condition is a lateral acceleration threshold.

13. The vehicle seat system of claim 7, further including a first membrane and a second membrane, wherein the first membrane is operatively connected to the first end member and the second end member on the first side of the main body member, and wherein the second membrane is operatively connected to the first end member and the second end member on the second side of the main body member, wherein the first side is opposite the second side.

14. The vehicle seat system of claim 7, wherein at least one of the first shape memory material connecting member, and wherein the second shape memory material connecting member is a shape memory alloy wire.

15. A method of morphing a portion of a vehicle seat, one or more actuators being located within the vehicle seat, the one or more actuators being operatively positioned such that, when activated, the one or more actuators cause a portion of the vehicle seat to morph into an activated configuration, the method comprising:
receiving sensor data from one or more sensors on a vehicle;
determining, based on the sensor data, whether a seat actuator activation condition is met; and
responsive to determining that the seat actuator activation condition is met, causing one or more actuators to be activated to cause a portion of the vehicle seat to morph into the activated configuration, the one or more actuators including:
a main body member, the main body member having a first end region including a first end and a second end region including a second end, the main body member having a first side and a second side;
a first end member, the first end member including a first fixed portion and a first pivoting portion, the first pivoting portion being pivotably connected to the first fixed portion, the first fixed portion being connected to the first side of the main body member in the first end region;
a first shape memory material connecting member connecting the first pivoting portion of the first end member to the main body member, the first shape memory material connecting member being located on one of the first side or the second side of the main body member;

a second end member, the second end member including a second fixed portion and a second pivoting portion, the second pivoting portion being pivotably connected to the second fixed portion, the second fixed portion being connected to the second side of the main body member in the second end region; and a second shape memory material connecting member connecting the second pivoting portion of the second end member to the main body member, the second shape memory material connecting member being located on an opposite one of the first side or the second side of the main body member from the first shape memory material connecting member, the actuator having a first dimension and a second dimension, the first dimension being substantially perpendicular to the second dimension, the first dimension being in a direction that extends through the first end member and the second end member, the actuator being configured such that, when an activation input is provided to the first and second shape memory material connecting members, the first and second shape memory material connecting members contract, causing the first pivoting portion of the first end member and the second pivoting portion of the second end member to pivot, thereby causing the actuator to morph into the activated configuration in which the second dimension increases.

16. The method of claim 15, wherein the portion of the vehicle seat is a seat cushion or a bolster of a seat cushion.

17. The method of claim 15, wherein the portion of the vehicle seat is a seat back or a bolster of the seat back.

18. The method of claim 15, wherein determining, based on the sensor data, whether a seat actuator activation condition is met includes:

comparing the sensor data to one or more thresholds, wherein the one or more thresholds includes a vehicle speed threshold, a steering angle threshold, or a lateral acceleration threshold; and if the sensor data meets the one or more thresholds, then a seat actuator activation condition is detected.

19. The method of claim 15, further including a first membrane and a second membrane, wherein the first membrane is operatively connected to the first end member and the second end member on the first side of the main body member, and wherein the second membrane is operatively connected to the first end member and the second end member on the second side of the main body member, wherein the first side is opposite the second side.

20. The method of claim 15, wherein at least one of the first shape memory material connecting member, and wherein the second shape memory material connecting member is a shape memory alloy wire.

* * * * *